United States Patent [19]

Boehme et al.

[11] 4,406,833

[45] Sep. 27, 1983

[54] SURFACTANTS DERIVED FROM FATTY ACID ESTERS AND PROTEINACEOUS MATERIAL

[75] Inventors: Werner R. Boehme, Glen Ellyn, Ill.; Oliver J. Muscio, Murray, Ky.

[73] Assignee: Fats and Proteins Research Foundation, Inc., Des Plaines, Ill.

[21] Appl. No.: 385,036

[22] Filed: Jun. 4, 1982

[51] Int. Cl.³ ............................ C07G 7/00; C08H 1/06
[52] U.S. Cl. ............................ 260/123.7; 260/112 R; 260/112 B; 260/121
[58] Field of Search ............... 260/112 B, 112 R, 121, 260/123.7

[56] References Cited

U.S. PATENT DOCUMENTS

| | | | |
|---|---|---|---|
| 2,041,265 | 5/1937 | Orthner et al. | 260/112 R |
| 2,113,819 | 4/1938 | Tucker | 260/112 R |
| 2,121,305 | 6/1938 | Schrader et al. | 260/121 |
| 2,127,841 | 8/1938 | Gellendien | 260/121 |
| 2,164,284 | 6/1939 | Ralston et al. | 260/112 R |
| 3,138,581 | 6/1964 | Young et al. | 260/121 X |
| 3,394,119 | 7/1968 | Luce et al. | 260/112 R |
| 3,712,865 | 1/1973 | Evans et al. | 260/121 |
| 3,954,725 | 5/1976 | Johnsen et al. | 260/123.7 X |
| 4,115,548 | 9/1978 | Marsh et al. | 424/70 |
| 4,116,986 | 9/1978 | Bistline, Jr. et al. | 260/401 |
| 4,128,543 | 12/1978 | Johnsen et al. | 260/112 B |
| 4,234,475 | 11/1980 | Sokol | 260/112 |

OTHER PUBLICATIONS

Textbook of Organic Chemistry, Chamberlain, 3rd Edition, 1934, p. 353.

*Primary Examiner*—Howard E. Schain
*Attorney, Agent, or Firm*—John S. Fosse

[57] ABSTRACT

A surface active agent is manufactured by reacting protein hydrolyzate material with a fatty acid ester in a mixture comprising an aprotic solvent and a basic catalyst.

10 Claims, No Drawings

SURFACTANTS DERIVED FROM FATTY ACID ESTERS AND PROTEINACEOUS MATERIAL

FIELD OF THE INVENTION

This invention relates generally to the industrial utilization of animal by-products from the meat-packing and rendering industries and more particularly to the manufacture of surfactants using the inedible protein by-products of these industries.

BACKGROUND OF THE INVENTION

Animal glue, hide trimmings, rendered fatty tissue, hair, feathers, hoofs, horn and the like comprise a potentially valuable source of such inedible proteins as collagen and alpha-keratin. However, the presence of both acidic and basic reactive side chains in the molecular make-up of these low-grade protein products complicates the chemistry of their commercial utilization. Nevertheless, it has heretofore been proposed to convert these products into surfactants by means of direct condensation with fatty acids. However, the direct condensation of proteins and fatty acids under high temperature conditions, as disclosed by Anderson el al in U.S. Pat. No. 2,164,284 has been found to result in compositions of effective surfactancy but having unacceptably dark color and offensive odor. As suggested by Sokol in U.S. Pat. No. 4,234,475 the latter problems may be diminished by carrying out the elevated temperature reaction in an oxygen-free, inert gas atmosphere. Sokol also teaches that causing the direct-addition reaction to take place in a solvent is of no particular advantage. Regardless, the costs of both providing an inert gas atmosphere and heating the reaction milieu to high temperature militates against commercial acceptability of the prior art direct condensation procedures.

BRIEF DESCRIPTION OF THE INVENTION

The present invention overcomes the limitations of the prior art by providing a surfactant which is the condensation product of hydrolyzed proteinaceous material with a fatty acid ester, rather than a fatty acid or fatty acid chloride. Reaction temperatures on the order of 130°–155° C. have proved adequate for rapid conversion; and reaction in an aprotic solvent such as dimethyl sulfoxide or 1-methyl-2-pyrrolidinone has proved eminently useful.

An important object of the present invention is therefore to provide a method of manufacturing a surfactant from animal by-product protein using practical, comparatively low temperatures.

A more general object of the invention is to provide a new and improved, animal by-product protein-derived surfactant.

Another object of the invention is to provide a solvent system which promotes condensation of fatty acid esters with a proteinaceous material.

These and other objects and features of the invention will become more apparent from a consideration of the following descriptions.

DETAILED DESCRIPTION OF THE INVENTION

The surfactants of the present invention are manufactured from hydrolyzed proteinaceous material such as hydrolyzed collagen, hydrolyzed gelatin and the like. A lower molecular weight, more completely hydrolyzed protein is preferred. These materials are reacted with a fatty acid ester, conveniently a low cost methyl ester, in which the fatty acid moiety contains from 8 to 18 carbon atoms; and such substances as methyl oleate and methyl tallowate have proved useful. The fatty acid esters of high grades of tallow may also be employed.

Condensation of the protein material with the fatty acid ester is promoted by the presence of an alkaline or basic catalyst such as sodium hydride or sodium hydroxide; and while the protein material can be introduced directly into liquified ester for reaction, it is more efficient to dissolve the protein and the basic catalyst first in a polar, aprotic solvent. Substantial completion of the condensation occurs in comparatively short times, on the order of one-and-one-half to two-and-one-half hours, at comparatively low temperatures, on the order of about 155° C. Side reactions in which the esters are converted to sodium soaps are minimized; and the final products are light tan in color, are essentially odorless and possess excellent surface active properties.

Efficient aprotic solvents for use in the practice of the invention comprise dimethyl sulfoxide and 1-methyl-2-pyrrolidinone. Hexamethyl-phosphoramide is less effective because both the sodium hydroxide catalyst and the protein material are only partially soluble in this substance. On the other hand, benzyl alcohol and N,N-dimethyl formamide are unsuitable due to their inability to dissolve even the hydroxide catalyst adequately.

In order to describe the invention more fully, the following specific examples are given, without however limiting the invention to the precise materials and conditions set forth.

EXAMPLES NO. 1 AND 2

Hydrolyzed collagen protein ("Lexein X350" from Inolex Corporation) was used as a starting material for the production of a surfactant composition; and in order to obtain anhydrous protein, the commercial solution was first adjusted to a pH of 9 and then triturated under several portions of acetone. The resultant light-colored powder was thereafter dried in a vacuum oven at 110°–125° C. for a period of about two hours and cooled in a vacuum desiccator. This highly hydrolyzed proteinaceous material is reported as having an average molecular weight on the order of about 1,000–3,000 g./mole and is commercially available as a 55% aqueous solution.

The prepared powdered collagen was added to methyl tallowate in a ratio of 5.6 parts of methyl tallowate to 10.9 parts of protein; and 0.54 parts of sodium hydride was included as a catalyst (Example No. 1). The reaction conditions and results are set forth in Table I below.

The foregoing procedure was repeated without the use of sodium hydride (Example No. 2); and comparison of the results demonstrates the effectiveness of the basic catalyst in promoting the reaction. The latter product was also noted as being comparatively dark and had poor surfactant properties.

EXAMPLES NO. 3, 4 AND 5

The procedure of Example No. 1 was repeated at three different reaction times and using 1.8 parts of sodium hydroxide as a catalyst instead of sodium hydride. The results are set forth in Table I.

In Example No. 4, the reaction time was reduced to five hours with only a small increase in the proportion of ester remaining unreacted. Approximately 84% of the tallow fatty acid was still incorporated into the product. However, when the reaction time was reduced further to two hours in Example No. 5, the proportion of unreacted fatty acid ester increased to 20% and only 74% of the tallow fatty acid was incorporated, even though somewhat higher reaction temperatures were employed.

EXAMPLE NO. 6 g. This was 96% of the theoretical yield (8.4 g.) calculated by assuming loss of water derived from the hydroxide and of the methanol derived from the methyl esters. Trituration of a 4 g. sample of the dry product and extraction of an acidified solution the same sample yielded 0.026 g. of unreacted ester (2% of the original) and 0.063 g. of free acid (2%).

The foaming properties and surface tension are reported in Table I.

TABLE I

| Example No. | Reaction Time (hr.) | Reaction Temp. (°C.) | Unreacted Ester (%) | Free Acid (%) | Hydrolyzed Acid (%) | Surface Tension at 0.1% (dyne/cm) | Foam (ml.) at 0.1% |
|---|---|---|---|---|---|---|---|
| 1 | 9.5 | 130–140 | 17 | 9 | — | 29 | 0.2 |
| 2 | 9.5 | 130–140 | 73 | 11 | — | 49 | 0 |
| 3 | 9.5 | 130–140 | 3 | 6 | — | 31 | 2.0 |
| 4 | 5.0 | 130–140 | 11 | 5 | — | 33 | — |
| 5 | 2 | 140–150 | 20 | 6 | 85 | 36 | — |
| 6 | 2 | 143–156 | 3 | 23 | — | 30 | 0.6 |
| 7 | 2.5 | 150 | 8 | 5 | 89 | 32 | 1.8 |
| 8 | 1.5 | 155 | 5 | 9 | 97 | 34 | 2.2 |
| 9 | 2 | 155 | 2 | 2 | — | 33 | 3.4 |

The steps of Example No. 1 were repeated except that 2.7 parts of sodium hydroxide were used instead of 1.8 parts. Improved conversion of the fatty acid ester was achieved as shown in the results in Table I. Nevertheless, the proportion of free fatty acid recovered, when an aqueous solution of the product was acidified and extracted, increased to an unacceptable 23%. Again, only 76% of the tallow fatty acid was incorporated into the product, while the additional sodium hydroxide apparently reacted with the methyl ester, causing its hydrolysis to the corresponding sodium soap.

EXAMPLES NO. 7 AND 8

The procedure of Example No. 1 was repeated but at two slightly elevated temperatures as set forth in Table I; and the corresponding reaction times were successfully reduced with increased incorporation of the tallowate.

In Examples No. 5, 7 and 8, a two gram sample of the reaction product was washed with hexane, dissolved in water, acidified, and the resulting solution further extracted by hexane, briefly vacuumized to remove suspended hexane and adjusted to pH 8.

This series of extractions was followed by refluxing overnight in 6 M hydrochloric acid to effect complete hydrolysis. A final extraction with hexane then gave, upon evaporation of solvent, the fatty acids incorporated into the product, which ranged from 85% to 97% of the amount of fatty acid expected from the ester initially present in the reaction mixture, thus indicating the efficiency of the reaction.

EXAMPLE NO. 9

In a one liter 3-necked flask was placed 14 ml. of dimethyl sulfoxide and 0.9 g. crushed sodium hydroxide pellets. The contents of the flask were heated to 155° C. under a nitrogen atmosphere, and then 5.4 g. dry, hydrolyzed collagen was added with vigorous magnetic stirring. When this dissolved, after brief stirring, 2.8 g. methyl oleate, was added, and the resulting mixture stirred for a further two hours. Upon completion of this period, the dimethyl sulfoxide was distilled off under vacuum; and the last residue of dimethyl sulfoxide driven off by further heating at 155° under vacuum. Essentially all of the original dimethyl sulfoxide was recovered. The product, a tan, friable solid weighed 8.1

EXAMPLE 10

A 14 ml. quantity of 1-methyl-2-pyrrolidinone and 0.9 g. of sodium hydroxide were placed in a 250 ml. 3-necked flask and heated at 155° C. at atmospheric pressure. The system was equipped with a motor mixer and a reflux condenser. When the catalyst had completely dissolved, 5.4 g. of a collagen hydrolyzate ("Nutraflex") which had been oven dried and stored in a desiccator were added utilizing a powder funnel. When the collagen hydrolyzate had completely dissolved, 2.8 g. of methyl tallowate were added; and the system was refluxed for two hours with continuous stirring. The solvent was then distilled under vacuum, leaving a dry, tan product. Actual yield closely approximated the theoretical yield.

In order to test the completeness of reaction, a 6 gram fraction of the reaction product was thoroughly triturated with 15–20 ml. of hexane and the hexane was then decanted. This procedure was repeated, using fresh hexane each time. The hexane extracts were combined and filtered, and the hexane was evaporated under vacuum. The residue produced was 0.1655 g. and represented the portion of fatty acid ester that did not react (less than 1%).

The purified product was dissolved in distilled water, made basic and diluted with further distilled water to make an approximately 0.5% solution.

The foaming abilities of this solution were tested by vigorously shaking a 5 ml. portion of solution in a stoppered 10 ml. graduated cylinder and then allowing it to stand. The foam height was checked after thirty seconds and then after two minutes.

The results shown below represented the average foam heights derived from several trial runs.

| FOAM HEIGHT OF DILUTE SOLUTION | |
|---|---|
| Time (Minutes) | Foam Height (Millimeters) |
| 0.5 | 6.2 (5.2 ml.) |
| 2.0 | 5.6 (4.7 ml.) |

EXAMPLE 11

The procedure used in Example 10 was repeated substituting Fancy Tallow (containing less than 2% free fatty acid) for methyl tallowate; and a product was produced which has similar foaming abilities.

The manner in which the present invention and the purposes to which it may be put are evident from the foregoing descriptions.

The invention is claimed as follows:

1. A surface active agent comprising the direct condensation reaction product of a fatty acid ester and a hydrolyzed proteinaceous material.

2. A surface active agent according to claim 1 wherein said proteinaceous material is an inedible, animal protein.

3. A surface active agent according to claim 2 wherein said protein is hydrolyzed collagen.

4. A surface active agent according to claim 1 wherein said fatty acid ester includes fatty acid moieties containing from 8 to 18 carbon atoms.

5. A surface active agent according to claim 1 wherein said fatty acid ester is a methyl ester.

6. The method of making a surface active agent which comprises the step of reacting a protein hydrolyzate directly with fatty acid ester in a solution of a basic catalyst dissolved in a solvent selected from the class consisting of dimethyl sulfoxide and 1-methyl-2-pyrrolidinone.

7. The method of making a surface active agent according to claim 5 wherein said fatty acid ester includes fatty acid moieties containing from 8 to 18 carbon atoms.

8. The method of making a surface active agent according to claim 5 wherein said fatty acid ester is a methyl ester.

9. The method of making a surface active agent according to claim 6 wherein said catalyst is sodium hydride.

10. The method of making a surface active agent according to claim 6 wherein said catalyst is sodium hydroxide.

* * * * *

UNITED STATES PATENT AND TRADEMARK OFFICE
CERTIFICATE OF CORRECTION

PATENT NO. : 4,406,833

DATED : September 27, 1983

INVENTOR(S) : Werner R. Boehme and Oliver J. Muscio

It is certified that error appears in the above-identified patent and that said Letters Patent is hereby corrected as shown below:

Column 5, Line 12, before "fatty acid" insert -- halogen-free --.

Column 5, Line 13, after "material" insert -- , wherein the reaction product is formed at a comparatively low temperature up to on the order of about 155°C. --.

Column 6, Line 1, change "a methyl ester" to -- selected from the group consisting of methyl esters and glyceryl esters --.

Column 6, Lines 3-8 inclusive should be cancelled and replaced by the following:

-- 6. A surface active agent according to Claim 1 wherein the reaction product is formed at a temperature in the range of from about 130°C. to about 155°C.

7. The method of making a surface active agent which comprises the step of reacting at a comparatively low temperature of up to about 155°C. a protein hydrolyzate directly with a halogen-free fatty acid ester in a solution of a basic catalyst dissolved in an aprotic solvent. --

Column 6, Line 9, change "7" to -- 8 --.

Column 6, Line 10, change "5" to -- 7 --.

Column 6, Line 13, change "8" to -- 9 --.

Column 6, Line 14, change "5" to -- 7 -- and cancel "a".

UNITED STATES PATENT AND TRADEMARK OFFICE
CERTIFICATE OF CORRECTION

PATENT NO. : 4,406,833

DATED : September 27, 1983

INVENTOR(S) : Werner R. Boehme and Oliver J. Muscio

It is certified that error appears in the above-identified patent and that said Letters Patent is hereby corrected as shown below:

Column 6, Line 15, change "methyl ester" to -- selected from the group consisting of methyl esters and glyceryl esters --.

Column 6, Line 16, change "9" to -- 10 --.

Column 6, Line 17, change "6" to -- 7 --.

Column 6, Line 20, change "10" to -- 11 --.

Column 6, Line 20, change "6" to -- 7 --.

Column 6, after the last line, add:

-- 12. The method of making a surface active agent which comprises the step of reacting at a temperature of from about 130°C. to about 155°C. a protein hydrolyzate with a halogen-free fatty acid ester in a solution of a basic catalyst dissolved in a solvent selected from the group consisting of dimethyl sulfoxide and 1-methyl-2-pyrrolidinone. --

Signed and Sealed this

Twenty-eighth Day of February 1984

[SEAL]

Attest:

Attesting Officer

GERALD J. MOSSINGHOFF

Commissioner of Patents and Trademarks